United States Patent
Roos et al.

(10) Patent No.: US 8,178,596 B2
(45) Date of Patent: May 15, 2012

(54) POLYACRYLAMIDE DELIVERY PRODUCT

(76) Inventors: Richard C. Roos, Benton City, WA (US); Richard A. Hansen, Richland, WA (US)

( * ) Notice: Subject to any disclaimer, the term of this patent is extended or adjusted under 35 U.S.C. 154(b) by 920 days.

(21) Appl. No.: 11/721,301

(22) PCT Filed: Feb. 2, 2006

(86) PCT No.: PCT/US2006/007075
§ 371 (c)(1),
(2), (4) Date: Jun. 8, 2007

(87) PCT Pub. No.: WO2006/091973
PCT Pub. Date: Aug. 31, 2006

(65) Prior Publication Data
US 2009/0239973 A1  Sep. 24, 2009

Related U.S. Application Data

(60) Provisional application No. 60/655,082, filed on Feb. 22, 2005.

(51) Int. Cl.
*C09K 17/00* (2006.01)
(52) U.S. Cl. ................................. 523/132
(58) Field of Classification Search ............ 523/132
See application file for complete search history.

(56) References Cited

U.S. PATENT DOCUMENTS

| | | | |
|---|---|---|---|
| 3,435,618 A | 4/1969 | Katzer | |
| 3,839,202 A | 10/1974 | Roy | |
| 3,860,526 A | 1/1975 | Corbett | |
| 4,820,424 A | 4/1989 | Field et al. | |
| 5,450,985 A | 9/1995 | Meuleman | |
| 5,749,672 A | 5/1998 | Chamberlain et al. | |
| 6,000,625 A | 12/1999 | Cole | |
| 6,395,051 B1 | 5/2002 | Arnold et al. | |
| 6,669,752 B2 | 12/2003 | Arnold et al. | |
| 6,749,748 B1 | 6/2004 | Macpherson et al. | |
| 7,094,443 B2 | 8/2006 | Loucks | |

FOREIGN PATENT DOCUMENTS

| | | |
|---|---|---|
| EP | 0169674 | 1/1986 |
| WO | WO 96/02126 | 2/1996 |
| WO | WO 02/88224 | 11/2002 |

OTHER PUBLICATIONS

R.E. Sojka, D.L. Bjorneberg, J.K. AASE, The PAMphlet, Note #02-98, USDA-Agricultural Research Service, Kimberly, ID.
Tim D. Stieber, Heidi Chapman Supkis, Troy Craft, Controlling Irrigation Induced Soil Erosion With PAM, 1994, University of Idaho.
C. Dean Yonts, Brian Benham, PAM—A Method to REduce Soil Erosion, Jun. 1998, University of Nebraska, Lincoln.
R.E. Sojka, The Use of PAM—A Linear Polyacrylamide for Use in Irrigation Water, Jan. 2001, Kimberly, Idaho, USA.
Earth Chem, Inc., SOILPAM!, www.earthchem.com/soilpam/htm, Sep. 2, 2004.
Burton, Daniel et al., "Effects of polyacrylamide application method on soil erosion and water infiltration," http://www.cropinfo.net/AnnualReports/1995/granbpam.htm, 1995, 6 pages, Ontario, Oregon.
Feibert, Erik B.G. et al., "a comparison of straw mulching and pam for potato production,"http://www.cropinfo.net/annualReports/1996/Spdpam96.htm, 1996, 6 pages, Ontario, Oregon.
Feibert, Erik B.G. et al., "Yield and quality of four potato cultivars in response to pam (polyacrylamide) treatment of irrigation water," http://www.cropinfo.net/AnnualReports/1995/SPDPAM95.htm, 1995, 8 pages, Oregon.
Shock, Clint et al., "Season-long comparative effectiveness of polyacrylamide and furrow mulching to reduce sediment loss and improve water infiltration in furrow irrigated onions," http://www.cropinfo.net/AnnualReports/1995/B3report.htm, 1995, 14 pages, Ontario, Oregon.
Trenkel, Jan et al., "Pam and/or low rates of straw furrow mulching to reduce soil erosion and increase water infiltration in a furrow irrigated field," http://www.cropinfo.net/AnnualReports/1995/vnreport.htm, 1995, 10 pages, Ontario, Oregon.
Shock, Clint et al., "Treatment of soil with bright sun soil booster and polyacrylamide as soil conditioners for improved seedling emergence," http://www.cropinfo.net/AnnualReports/Old/pamsoilcond1992.htm, 1992, 3 pages, Ontario, Oregon.

*Primary Examiner* — Edward Cain
(74) *Attorney, Agent, or Firm* — Venable, Campillo, Logan & Meaney, P.C.

(57) ABSTRACT

The PAM delivery product is a solid form of polyacrylamide polymer (PAM). Among other things, the PAM delivery product can be used to prevent ruts formed during center-pivot irrigation, prevent erosion of irrigation ditches, clarify wastewater, and assist seed germination and seedling establishment. The PAM delivery product includes pure PAM and water to create a solid "loaf." Water-soluble calcium (Ca) can also be added to the PAM delivery product depending on the specific application for the PAM delivery product. When Ca is used in the PAM delivery product, it is present in a 9:1 ratio to the PAM There are no fixing agents needed in the PAM delivery product; it is pure active ingredient.

22 Claims, 2 Drawing Sheets

Fig. 1
Fig. 1A
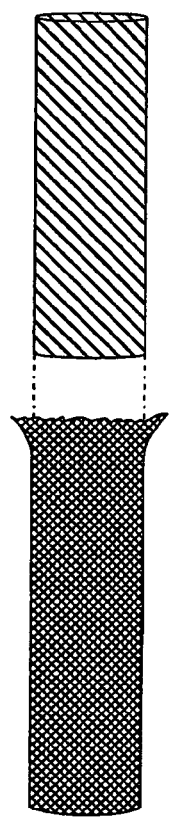
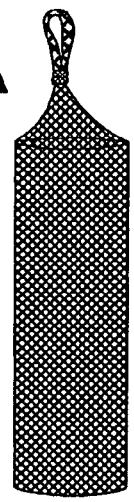
Fig. 1B
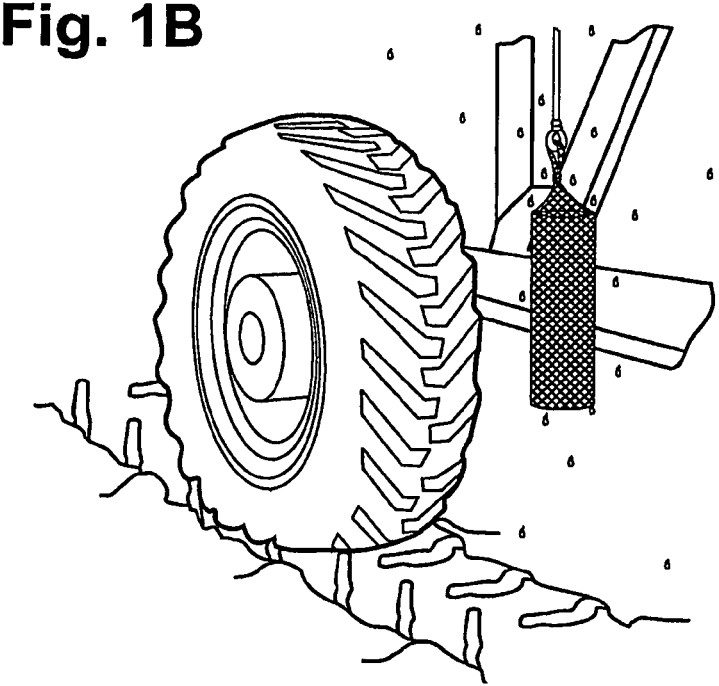

POLYACRYLAMIDE DELIVERY PRODUCT

CROSS-REFERENCE TO RELATED APPLICATION

The present application claims priority to copending U.S. provisional application entitled "Polyacrylamide Delivery Product," having Ser. No. 60/655,082, filed by inventors Richard C. Roos and Richard A. Hansen on Feb. 22, 2005, which is entirely incorporated herein by reference.

FIELD OF THE INVENTION

The present invention relates generally to soil and water agricultural applications and, more particularly, to polyacrylamide ("PAM") in agricultural applications (i.e. erosion control in irrigation ditches, rut prevention in center-pivot irrigation, clarifying waste water, and assisting seed germination and seedling establishment).

BACKGROUND OF THE INVENTION

Agricultural applications of PAM are well known in the prior art. Specifically, PAM has been used in agricultural applications to prevent soil erosion in irrigation ditches and reduce sediment in irrigation water. PAM is a long-chain synthetic polymer that acts as a strengthening agent, binding soil particles together. The bound soil particles become relatively large aggregates and are too heavy to remain suspended in the water. Because the soil aggregates are heavy, they fall to the bottom of the irrigation ditch and settle into the cracks in the ditch bottoms rather than eroding out of the irrigation ditch.

Erosion prevention is desired in agriculture because the topsoil is the most fertile area for crops to grow. When crops are irrigated without adding PAM to the system, topsoil erodes as the irrigation water passes over the soil. The soil particles are moved by the force of the water and are deposited at the end of the irrigation ditch. The erosion process is slow, however, the topsoil is gradually removed, and the fields become less productive.

Another problem associated with erosion is plant water stress. As the growing season progresses and crops are regularly irrigated, the irrigation ditches can become narrow, deep-cut channels due to erosion. Depending on how deep the channels become, the irrigation water may be applied below the most active portion of the root zone of the plant. When this occurs, the crops experience water stress. To reduce the water stress, the irrigation water must be moved up in the soil profile, which requires a constant water source and is costly and inefficient.

In addition to erosion control, PAM can increase the intake rate of some soils. Without PAK soil particles come into suspension in the irrigation water. The small soil particles find their way into the larger pore spaces on the bottom of the irrigation ditch and form a seal on the bottom of the irrigation ditch with finely packed small soil particles. Thus, the infiltration rate of the soil is reduced. However, when PAM is added to the irrigation water, its binding particles increase the infiltration rate by maintaining the soil structure. The aggregates formed by the PAM contain microscopic pores through which water can pass. These aggregates fall onto the bottom of the ditches and make it easier for the water to pass through the soil than when the finely packed small soil particles coat the ditch. The increased intake rate of the soil helps with rut prevention caused by center pivot irrigation system tires.

Prior use of PAM has been disclosed in U.S. Pat. No. 6,749,748 (Macpherson et al.), U.S. Pat. No. 6,669,752 (Arnold et al.), U.S. Pat. No. 6,395,051 (Arnold et al.), U.S. Pat. No. 6,000,625 (Cole), U.S. Pat. No. 5,749,672 (Chamberlain et al.), U.S. Pat. No. 5,450,985 (Meuleman), U.S. Pat. No. 4,820,424 (Field et al.), U.S. Pat. No. 3,860,526 (Corbett), U.S. Pat. No. 3,839,202 (Roy), and U.S. Pat. No. 3,435,618 (Katzer). However, each of these disclosures suffers from one or more of the following disadvantages. First, the PAM forms previously disclosed are not pure active ingredient. The prior art PAM forms include fixing agents that account for the majority of the mass of the PAM form. The fixing agents are present in the prior art for various reasons including, but not limbed to, aiding the release of PAM molecules and aiding in binding the PAM into a solid form. Second, the PAM forms previously disclosed must be placed in a turbulent flow stream in order to dissolve. If the PAM forms are not placed in turbulent flow conditions, they will not dissolve quickly enough to provide sufficient molecules to prevent erosion. Third, at least some the PAM forms previously disclosed are powder tablets. The powder tablets break easily and the powder blows away. Fourth, at least some of the prior art PAM forms require high molecular weight PAM. What is needed is a PAM delivery product that dissolves relatively easily, requires no fixing agents, and does not easily break apart and blow away.

SUMMARY OF THE INVENTION

The present invention is incorporated into a PAM delivery product that provides an improved and more efficient way to create and deliver PAM molecules to soil or water. The PAM delivery product consists of granular PAM mixed with enough water to form a solid, somewhat pliable mass or "loaf." Depending on the intended application of the product, soluble calcium may be added to the PAM loaf. The PAM delivery product of the present invention does not require any fixing agents. It is pure active ingredient.

It is an object of the PAM delivery product to provide a form of PAM that is pure active ingredient.

It is a further object of the PAM delivery product to provide a form of PAM that easily dissolves without requiring turbulent flow.

It is a further object of the PAM delivery product to provide a form of PAM that is not brittle and does not break apart easily.

It is a further object of the PAM delivery product to provide a form of PAM that improves percolation of water through the soil profile.

It is a further object of the PAM delivery product to provide a form of PAM that aids in prevention of soil erosion.

It is a further object of the PAM delivery product to provide a form of PAM that aids in clarifying wastewater.

It is a further object of the PAM delivery product to provide a form of PAM that aids in seed germination and seedling establishment.

It is a further object of the PAM delivery product to provide a form of PAM that prevents ruts from forming during center-pivot irrigation of crops.

It is a further object of the PAM delivery product to provide a form of PAM that seals irrigation ditches.

It is a further object of the PAM delivery product to provide a form of PAM that resists breakdown from sun and water.

The novel features that are considered characteristic of the invention are set forth with particularity in the appended claims. The invention itself, however, both as to its structure and its operation together with the additional object and advantages thereof will best be understood from the following description of the preferred embodiment of the PAM delivery product when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6 are sought to be invoked to define the invention(s), the claims will specifically state the phrases "means for" or "step for" and a function, without also reciting in such phrases any structure, material, or act in support of the function.

Moreover, even if the provisions of 35 U.S.C. §112, paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later developed equivalent structures, materials, or acts for performing the claimed function.

BRIEF DESCRIPTION OF THE DRAWINGS

FIG. 1 depicts the PAM loaf being inserted into the mesh bag.

FIG. 1A depicts the PAM delivery product.

FIG. 1B depicts the PAM delivery product hanging over the tire track of a center pivot irrigation system.

DESCRIPTION OF PREFERRED EMBODIMENTS

Figure 2:
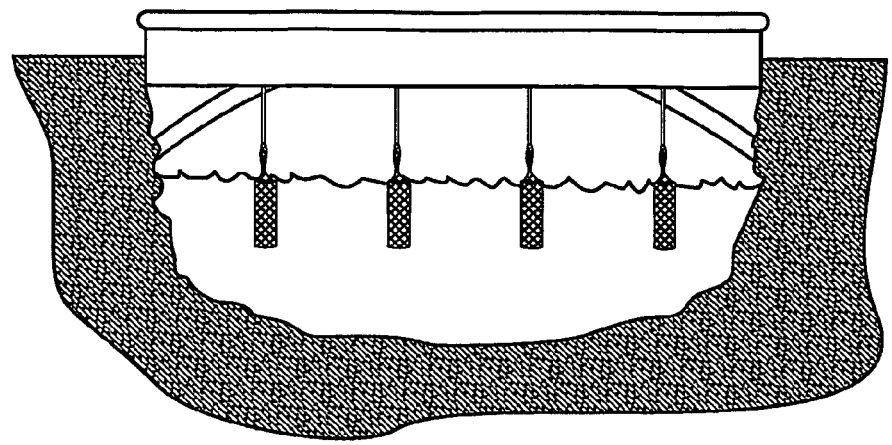
FIG. 2 depicts multiple PAM delivery products suspended from a bridge into a wastewater pond.

The PAM delivery product 100 shown in FIG. 1A consists of polyacrylamide polymer (PAM) that is mixed with enough water in a mold to form a solid, somewhat pliable mass or PAM "loaf" 110 inserted into a mesh bag 120. For the applications described herein, it is preferred to form the PAM loaf 110 in two sizes: a five (5) pound loaf and a two and one half (2.5) pound loaf. However, the PAM loaf 110 can be made to any size desirable.

Basic PAM Loaf

A typical five (5) pound PAM loaf 110 can be made as follows. Combine 64 ounces of water in a mold with five (5) pounds of granular PAM. Preferably, the PAM has a molecular weight of 10,000 to 100,000. Agitate the PAM and water to thoroughly mix the PAM and water. It is preferred to agitate the solution immediately after mixing for approximately ten (10) seconds. Allow the solution to sit in the mold for approximately 30 minutes to set up into a solid PAM loaf 110. Any size and shape of a mold can be used. For the uses disclosed herein, it is preferred to create a sausage-shaped loaf that is 20 inches long and 4 inches in diameter. Here, the PAM loaf 110 is noticeably free from fixing agents.

For the purposes of this specification, the term "fixing agent" means any material that is combined with water and granular or powder PAM to create a solid form. Commonly used fixing agents include sodium, potassium or ammonium salt of carbonic acid, sulphuric acid, silicic acid, benzoic acid, citric acid, phosphoric acid, boric acid, or the salts in combination with carbonate salt; sodium tetraborate in combination with carbonate salt; tripolyphosphate; sodium tetraborate in combination with sodium or potassium carbonate; water soluble wax matrix wherein the wax is solid at 20° C. and melts below 250° C., water soluble multivalent metal coagulants; alkane polyol containing 2-6 carbon atoms and 2-6 hydroxyl groups, polyglycerol ester, monosaccharide, or polysaccharide; ethylene glycol, propylene glycol glycerine, sorbitol sorbitol derivative, polygylcerol ester, or sucrose; ethylene glycol, propylene glycol, glycerine, or sucrose; and any combination thereof.

Once the PAM loaf 110 has solidified, it is removed from the mold and placed in a mesh bag 120. The mesh bag 120 is prepared by cutting mesh to a 36-inch length and crimping one end closed with a 50-pound tensile strength cable tie 130. In an alternate embodiment, the end of the mesh could be crimped closed using a galvanized or stainless steel hog ring. The PAM loaf 110 is removed from the mold and inserted into the open end 140 of the mesh bag 120 so that it rests against the closed end 150 of the mesh bag 120. The PAM loaf 110 takes up approximately 20-inches of the bottom portion of the mesh bag 120, leaving approximately 16-inches of the mesh bag 120 as excess at the top. The 16-inch excess is folded in half to form an 8-inch loop 160, and a 50-pound tensile strength cable tie 130 seals the loop 160 near the top of the PAM loaf 110. In an alternate embodiment, the loop 160 could be sealed with a galvanized or stainless steel hog ring. The 8-inch loop 160 is used to hang the PAM delivery product 100 during use. The mesh bag 120 has holes 170 that are approximately ½"-¾" that allow water to contact and dissolve the PAM loaf 110.

A typical two and a half (2.5) pound PAM loaf 110 can be made by following the same steps for making a five (5) pound PAM loaf 110 but using half as much water and half as much PAM. Again, the PAM loaf 110 is free from fixing agents.

The examples set forth above represent a water/PAM ratio of 1.25:1. However, other water/PAM ratios can be used. In order to form a solid PAM loaf 110 that will dissolve in an effluent stream or other body of water to release the PAM molecules at a controlled rate, it is preferred to have a range of 40% to 60% by weight of PAK with the preferred range being from 44% to 55% by weight. The water is present by weight in the amount of 40% to 60% with the preferred range being 45% to 56%. The relative proportions of the PAM and the water can be adjusted to form a solid PAM loaf 110. Using this procedure, it is preferred that a PAM loaf 110 can be created where the total PAM and water total 100% by weight.

Soluble Calcium Option

Depending on the soil conditions, it may be advantageous to add soluble calcium (Ca) to the PAM loaf 110. Ca is often advantageous when the soil requires conditioning. Although Ca is preferred, any other soil conditioning agent, including but not limited to gypsum, can be added to the PAM loaf 110 depending on the soil.

When Ca is added to the PAM loaf 110, the PAM to Ca ratio is preferably 9:1. However, the ratio may be modified to meet special soil conditions. The weight of both the PAM and the Ca is adjusted to achieve the desired ratio. In order to create a PAM loaf 110 with the preferred 9:1 PAM to Ca ratio, one (1) pound of Ca is dissolved in enough water to yield a one (1) gallon water-Ca solution. When Ca is not used in the PAM loaf 110, water is used in a 1:1 ratio to the water-Ca solution.

The PAM loaf 110 with Ca is composed of PAM preferably present in proportions by weight of 40% to 49%, Ca preferably present in proportions by weight of 4% to 6%, and the balance being water with the relative proportions of these ingredients being adjusted to form a solid PAM loaf 110. In this embodiment, the PAM Ca, and water together comprise 100% by weight of the PAM loaf 110.

APPLICATION EMBODIMENT EXAMPLES

The following non-limiting examples set forth examples of how the PAM delivery product 100 can be employed.

Example 1

Center-Pivot Irrigation

When the PAM delivery product 100 is used with center-pivot irrigation systems 200, the PAM delivery product 100 is secured to the irrigation tower 210 and allowed to hang over the track 220 in the soil 250 created by the tires 230 of the irrigation tower 210 as seen in FIG. 1B. As the water 240 from the irrigation tower 220 sprays over the PAM delivery product 100, the PAM loaf 110 is dissolved, and the PAM molecules are evenly dispersed into the soil 250 of each tire track 220.

In this example, the PAM delivery product 100 is used to minimize creation of ruts in center-pivot irrigation tire tracks 220. When center-pivot irrigation systems 200 are used in fields, deep ruts are formed over time by the tires 230 of the irrigation unit 200. The irrigation unit tires 230 repeatedly pass over the same tracks 220 in the field, and as the tracks 220 become wet, the tires 230 create deep ruts that are not easily dried. The deep ruts are hard on irrigation and harvest equipment and are responsible for many costly repairs to irrigation equipment, as well as crop-damaging loss of irrigation time while equipment is not working. Additionally, the ruts reduce the efficiency of harvest equipment because the equipment gets stuck in the deep, wet ruts in the fields.

To prevent the creation of ruts in center-pivot irrigation tracks 220 and the associated problems, the PAM delivery products 100 made in the manner described above are hung along the length of the irrigation tower 210 over each tire track 220. Preferably, the PAM delivery product 100 hangs from the irrigation system 200 just above the tire track 220 and in a position where the spray 240 from the sprinklers comes in contact with the PAM delivery product 100. Water 240 from the irrigation sprinklers slowly dissolves the PAM loaf 110 in the mesh bag 120, and the PAM molecules are dispersed into the soil 250 of the track 220 as the irrigation unit 200 moves around the field. Once the PAM molecules are present in the track 220, they act as flocculents, and the soil particles begin to form aggregates and micro pores around the PAM molecules as PAM moves into the soil. The water in the track 220 percolates through these micro pores into the soil 250 causing the tracks 220 to dry and prevent ruts from forming.

Example 2

Sealing Irrigation Ditches

Figure 2A:
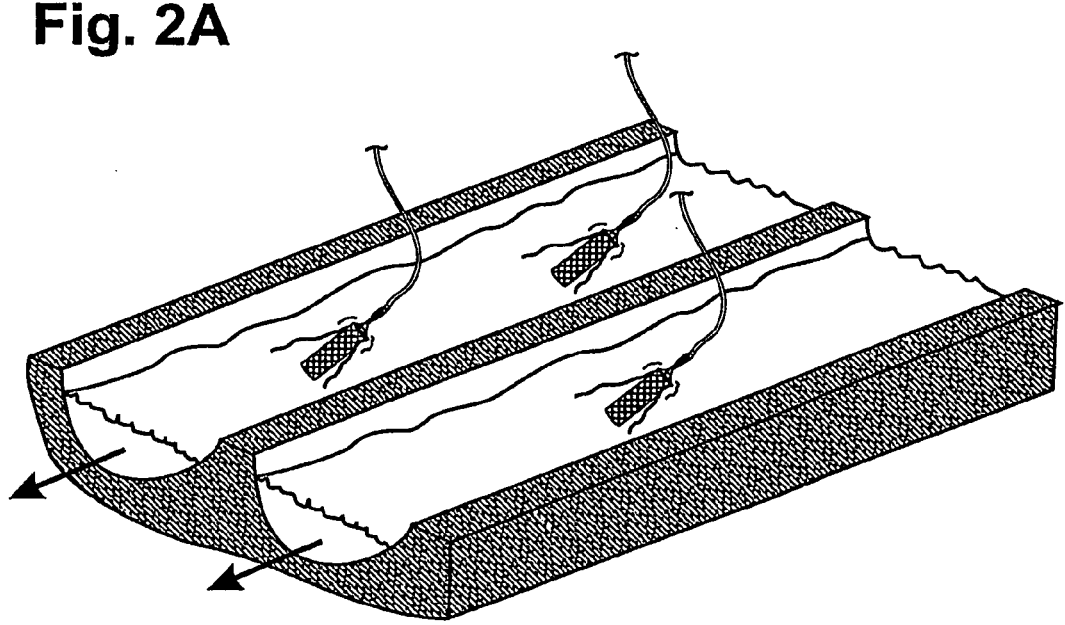
FIG. 2A depicts multiple PAM delivery products suspended into irrigation ditches.

When used to seal irrigation ditches 300, the PAM delivery product 100 is suspended in the irrigation ditches 300 and left to dissolve as shown in FIG. 2A. The PAM delivery product 100 can be suspended from an engineered structure by rope 310 or cable 310. Turbulent flow of water is not necessary for the PAM loaf 110 to dissolve in the mesh bag 120.

In this example, the PAM delivery product 100 is used to seal irrigation ditches 300 to prevent water loss and erosion. Irrigation ditches 300 are often constructed through porous soils or rock with large cracks and pore spaces. The water lost through the cracks and pore spaces in the irrigation ditches 300 increases operating costs and wastes precious resources in arid areas. In addition, soil particles suspended in irrigation water 320 cause wear on pumps and other irrigation components as they infiltrate into the equipment. The reduction of soil particles in the irrigation water 320 reduces pump repair and equipment replacement.

The PAM delivery product 100, as described above, is suspended in irrigation ditches 300 to aid in sealing the ditches 300 to prevent water loss and erosion. Preferably, more that one PAM delivery product 100 is suspended along the irrigation ditches 300 to provide an even and sufficient distribution of PAM molecules into the soil. As the PAM loaves 110 dissolve in the water, PAM molecules are released which attract the soil particles. The soil particles form aggregates that are too heavy to remain suspended in the water. The aggregates fall to the bottom of the irrigation ditch 300 and settle into the cracks and large pore spaces, ultimately filling and plugging the cracks. Thus, the soil particles do not get into the pumps, erosion is reduced, and the water remains in the irrigation ditches 300.

Example 3

Clarifying Wastewater

When used to clarify wastewater 400, the PAM delivery product 100 is suspended in turbid water and left to dissolve as shown in FIG. 2. The PAM delivery product 100 can be suspended from an engineered structure 410 by rope 310 or cable 310.

In this example, the PAM delivery product 100 is used to clarify wastewater 400. Dairies, feed yards, and even industrial units create wastewater 400 that must be treated before recycling or releasing it into streams, lakes, etc. The PAM delivery product 100 is suspended in wastewater lagoons 420 or treatment facilities with turbid wastewater 400. The PAM loaf 110 dissolves in the wastewater 400 and releases molecular flocculants of PAM which bind to suspended solids and form relatively large aggregates. The aggregates fall out of suspension leaving water that is relatively free from solids and can be recycled or released into streams, lakes, etc.

Example 4

Seed Germination and Establishment

In this example, the PAM delivery product 100 is used to assist seed germination and seedling establishment. When seeds are planted, it is important that they get the proper amount of water in the critical germination zone to promote rapid germination. Additionally, after the seeds germinate, it is important that the seedlings be able to emerge easily through the topsoil. However, if soil crust is formed around the seedlings, they may not be able to emerge causing substantial crop loss. When the PAM delivery product 100 is suspended in the irrigation ditches 300, sufficient water is retained in the critical germination zone, and soil crust is discouraged from forming. The PAM molecules have a strong attraction for water molecules as well as soil particles, and, therefore, bind to the soil and the water in the critical germination zone and increase retention of water near the seed. Also, the PAM molecules flocculate the soil into microscopic aggregates, discouraging formation of soil crust that is a barrier to the seedlings emergence.

The preferred embodiment of the invention is described in the Description of Preferred Embodiments. While these descriptions directly describe the one embodiment, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method of making a PAM loaf comprising the steps of:
   A. adding water to a mold;
   B. adding PAM to the mold to create a mixture of water and PAM;
   C. agitating the mixture to thoroughly mix the PAM and water; and
   D. allowing the mixture to solidify.

2. The method of claim 1 further comprising the steps of:
   A. adding the water to the mold wherein the water is present in the amount of 40%-60% by weight; and
   B. adding the PAM to the mold wherein the PAM is present in the amount of 40%-60% by weight, such that the PAM and water total 100% by weight of the resulting mixture.

3. The method of claim 1 further comprising the step of:
   A. adding the PAM to the mold wherein the PAM has a molecular weight of 10,000 to 100,000.

4. The method of claim 1 further comprising the step of:
   A. putting the PAM loaf in non-turbulent water.

5. A method of making a PAM loaf comprising the steps of:
   A. creating a solution by adding water soluble calcium to water;
   B. allowing the water soluble calcium to dissolve;
   C. adding the solution to a mold;
   D. adding PAM to the mold to create a mixture of the solution and the PAM;
   E. agitating the mixture to thoroughly mix the solution and the PAM; and
   F. allowing the mixture to solidify in the mold.

6. The method of claim 5 further comprising the steps of:
   A. adding the water wherein the water is present in the amount of 40%-60% by weight;
   B. adding the calcium wherein the calcium is present in the amount of 4%-6% by weight;
   C. adding the PAM to the solution wherein the PAM is present in the amount of 40%-60% by weight, such that the water, PAM, and calcium total 100% by weight of the resulting mixture.

7. The method of claim 5 further comprising the step of:
   A. putting the PAM loaf in non-turbulent water.

8. A method for minimizing the creation of ruts in center pivot irrigation tire tracks comprising the steps of:
   A. creating a PAM loaf;
   B. placing the PAM loaf in a permeable bag; and
   C. hanging the permeable bag with the PAM loaf on a tower of a center-pivot irrigation system in a place where the bag will be sprayed when the irrigation system is on, and where the bag is hung over a tire track of the center-pivot irrigation system.

9. The method of claim 8 further comprising the step of:
   A. dissolving the PAM loaf with water from a sprinkler of the center-pivot irrigation system such that PAM molecules are released from the PAM loaf into a tire track of the center-pivot irrigation system.

10. The method of claim 9 further comprising the step of:
    A. discharging the PAM molecules to flocculate soil particles in the tire track of the center-pivot irrigation system such that small pores are opened in the track that aid water percolation into the soil and allow the tire track of the center-pivot irrigation system to dry.

11. A method for sealing irrigation ditches comprising the steps of:
    A. creating a PAM loaf;
    B. placing the PAM loaf in a permeable bag; and
    C. suspending the permeable bag with the PAM loaf into an irrigation ditch.

12. The method of claim 11 further comprising the step of:
    A. dissolving the PAM loaf in water in the irrigation ditch such that PAM molecules are released from the PAM loaf into the irrigation ditch.

13. The method of claim 12 further comprising the step of:
    A. allowing the PAM molecules to flocculate soil particles and form aggregates.

14. The method of claim 13 further comprising the step of:
    A. filling cracks and large pore spaces with the aggregates that fall out of the water in the irrigation ditch.

15. A method for clarifying wastewater comprising the steps of:
    A. creating a PAM loaf;
    B. placing the PAM loaf in a permeable bag; and
    C. suspending the permeable bag with the PAM loaf in turbid water.

16. The method of claim 15 further comprising the step of:
    A. dissolving the PAM loaf in the turbid water such that PAM molecules are released from the PAM loaf into the turbid water.

17. The method of claim 16 further comprising the step of:
    A. allowing the PAM molecules to flocculate suspended solids in the turbid water and form aggregates.

18. The method of claim 17 further comprising the step of:
    A. clarifying the turbid water as the aggregates fall out of suspension.

19. A method for assisting seed germination and seedling establishment comprising the steps of:
    A. creating a PAM loaf;
    B. placing the PAM loaf in a permeable bag; and
    C. suspending the permeable bag with the PAM loaf in irrigation water such that the irrigation water comes in contact with a seed.

20. The method of claim 19 further comprising the step of:
    A. dissolving the PAM loaf in the irrigation water such that PAM molecules are released from the PAM loaf into the irrigation water.

21. The method of claim 20 further comprising the step of:
    A. binding PAM molecules to soil and water in the critical germination zone of a seed such that water retention is increased near the seed.

22. The method of claim 21 further comprising the step of:
    A. flocculating soil into microscopic aggregates such that soil crust is prevented from forming a barrier to seedling emergence.

* * * * *